United States Patent
Ho

(10) Patent No.: US 7,668,126 B2
(45) Date of Patent: Feb. 23, 2010

(54) BEACON COORDINATION AND MEDIUM ACCESS

(75) Inventor: Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 698 days.

(21) Appl. No.: 11/011,963

(22) Filed: Dec. 14, 2004

(65) Prior Publication Data
US 2005/0174953 A1    Aug. 11, 2005

Related U.S. Application Data

(60) Provisional application No. 60/542,170, filed on Feb. 5, 2004, provisional application No. 60/542,338, filed on Feb. 6, 2004.

(51) Int. Cl.
*H04B 13/00* (2006.01)
*H04L 12/28* (2006.01)
*H04L 12/56* (2006.01)

(52) U.S. Cl. .................. 370/310; 370/395.4
(58) Field of Classification Search .......... 370/310
See application file for complete search history.

(56) References Cited

U.S. PATENT DOCUMENTS

| 6,982,987 B2* | 1/2006 | Cain ............... 370/442 |
| 7,412,265 B2* | 8/2008 | Chen et al. ........ 455/574 |
| 7,450,553 B2* | 11/2008 | Park et al. ........ 370/338 |
| 7,564,812 B1* | 7/2009 | Elliott ............. 370/329 |
| 2006/0104301 A1* | 5/2006 | Beyer et al. ...... 370/445 |

* cited by examiner

*Primary Examiner*—Vincent P Harper
*Assistant Examiner*—Marivelisse Santiago-Cordero
(74) *Attorney, Agent, or Firm*—Steven A. Shaw; W. James Brady; Frederick J. Telecky, Jr.

(57) ABSTRACT

Each of a plurality of nodes in a wireless network is capable of generating, transmitting, and receiving beacons in a distribute fashion. Each beacon contains information regarding the order of which other nodes are to transmit beacons and wireless medium access information at to when various nodes are to access the network. Nodes that are in separate "extended neighborhoods" are permitted to transmit their beacons simultaneously without risking beacon collisions. The beacons contain information that is used to ensure this result. Using the distributed beacon mechanism, each nod can reserve access to the wireless medium. In the disclosed embodiments, a central coordinator is not needed.

11 Claims, 4 Drawing Sheets

130 — RECEIVE A BEACON FROM ANOTHER NODE

132 — GENERATE A BEACON BASED ON THE RECEIVED BEACON TO SPECIFY FUTURE NODES TO TRANSMIT BEACONS AND THE IMMEDIATE NEIGHBORHOOD INFORMATION OF THE NODE GENERATING THE BEACON

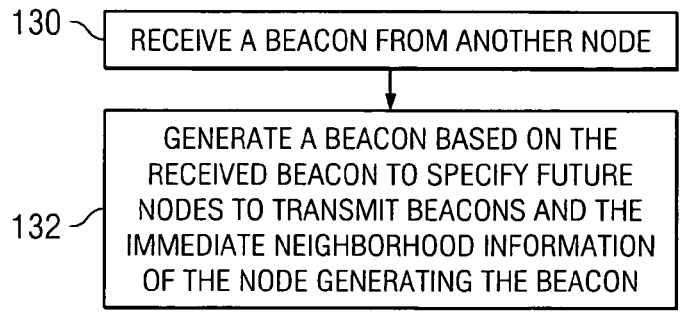

FIG. 4

130 — RECEIVE A BEACON FROM ANOTHER NODE

132 — GENERATE A BEACON BASED ON THE RECEIVED BEACON TO SPECIFY FUTURE NODES TO TRANSMIT BEACONS AND THE IMMEDIATE NEIGHBORHOOD INFORMATION OF THE NODE GENERATING THE BEACON

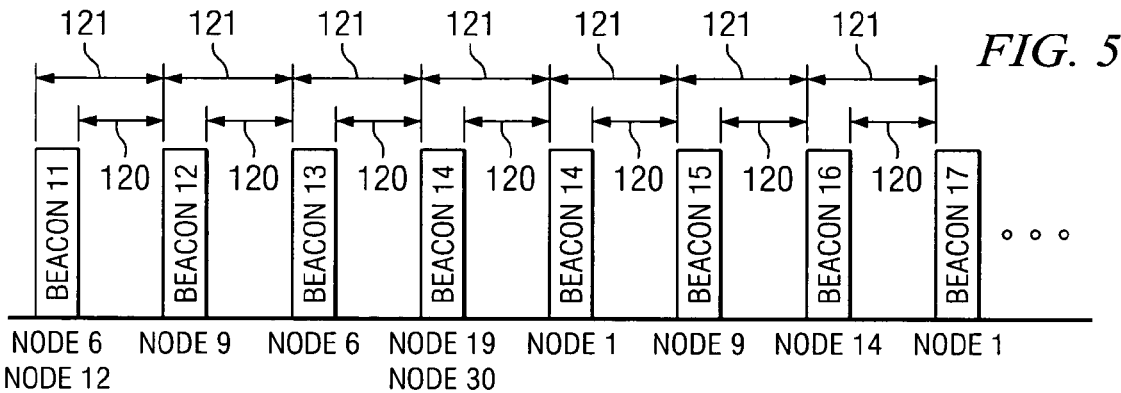

BEACON FRAME PAYLOAD FORMAT

| OCTETS: 26 | 8-254 | 0-250 | 0-254 | 4-254 | 6-255 | 0-p |
|---|---|---|---|---|---|---|
| BEACON PRIMARY FIELD | STATIC MEDIUM ACCESS IE | DYNAMIC MEDIUM ACCESS IE | DYNAMIC NODE ORDER IE | STATIC NODE ORDER IE | NODE CAPABILITY IE | OTHER PERMITTED IEs |
| 150 | 152 | 154 | 156 | 158 | 160 | 162 |

FIG. 6B

BEACON PRIMARY FIELD FORMAT  150

| OCTETS: 8 | 2 | 6 | 8 | 1 | 1 |
|---|---|---|---|---|---|
| BEACON COUNTER | BEACON INTERVAL | BEACON SET ID | BEACON TA | BEACON COUNTDOWN | RESERVED |
| 164 | 166 | 168 | 170 | 172 | 174 |

…

BEACON COORDINATION AND MEDIUM ACCESS

RELATED APPLICATONS

This application claims priority to the following Provisional Patent Applications, both of which are incorporated herein by reference: Appl. No. 60/542,170 entitled "Adaptive Beacon Circulation for Medium Access Control," filed Feb. 5, 2004 and Appl. No. 60/542,338 entitled "Medium Access Control Via Adaptive Beacon Coordination," filed Feb. 6, 2004.

BACKGROUND

In a wireless communication network, two or more wireless-capable devices (e.g., computers) communicate with one another over a wireless medium. Most wireless networks include a provision to coordinate access to the wireless medium in an attempt to avoid message "collisions" in which two or more messages are received simultaneously thereby interfering with each other. In some networks, one or more of the nodes serves as a central coordinator to coordinate access to the wireless medium on the part of the other nodes. While generally satisfactory, this approach suffers if the central coordinator moves out of range of one or more of the other nodes. Being out of range could result if the central coordinate is a mobile device and is moved away relative to the other nodes, or if one or more of the other nodes is mobile and is moved away relative to the central coordinator. A wireless medium access coordination scheme that addresses this issue is desirable, particularly one that permits faster, more efficient access to the wireless medium.

SUMMARY

Various embodiments are described herein of a wireless network capable in which each of a plurality of nodes generates and transmits beacons in a distributed fashion. Each beacon contains information regarding the order of which other nodes are to transmit beacons and wireless medium access information as to when various nodes are to access the network. Nodes that are in separate "extended neighborhoods" are permitted to transmit their beacons simultaneously without risking beacon collisions. The beacons contain information that is used to ensure this result. Using the distributed beacon mechanism, each node can reserve access to the wireless medium. In the disclosed embodiments, a central coordinator is not needed.

In accordance with at least one embodiment, a method is disclosed that is implemented in a wireless communication network comprising a plurality of nodes that communicate across a wireless medium. The method comprises a first node receiving a first beacon from a second node. The beacon identifies a node within communication range of the second node. The first node generates a second beacon based on the first beacon. The second beacon specifies an order of nodes that are to transmit beacons and, for each such node, whether that node is within wireless communication range of the first node.

In accordance with another embodiment of the invention, a method (and associated method) comprises generating a wireless medium access change beacon that contains a reservation request to reserve access to the wireless medium. The method also comprises transmitting the beacon across the wireless medium and implementing the reservation request after other nodes receive the wireless medium access change beacon.

In other disclosed embodiments, a node, operable in a wireless network, comprises host logic and a wireless transceiver coupled to the host logic. The wireless transceiver receives a first beacon from a transmitting device. The first beacon is configured to identify another device that is within communication range of the transmitting device. The host logic generates a second beacon based on the first beacon. The second beacon specifies an order of devices that are to transmit beacons and, for each such device, whether that device is within communication range of the node.

In yet another embodiment, a node comprises host logic and e wireless transceiver. The host logic causes the wireless transceiver to generate a wireless medium access change beacon that contains a reservation request to reserve access to the wireless medium. The wireless transceiver receives a wireless medium access change beacon from another node. The received wireless medium access change beacon also contains a reservation request to reserve access to the wireless medium.

In yet another embodiment, a system comprises a plurality of wireless communication devices. Each wireless communication device is capable of transmitting beacons and receiving beacons and is capable of communicating with at least one other wireless communication device. Each wireless communication device transmits a beacon that encodes which other devices are within wireless communication range of that device. In this embodiment, at least two wireless communication devices transmit beacons simultaneously.

Another embodiment is directed to a system that comprises a plurality of wireless communication devices. Each wireless communication device is capable of communicating with at least one other wireless communication device. Each wireless communication device is capable of transmitting a request to reserve wireless medium access.

BRIEF DESCRIPTION OF THE DRAWINGS

For a detailed description of exemplary embodiments of the invention, reference will now be made to the accompanying drawings in which:

FIG. 4 illustrates a method embodiment;

FIG. 5 illustrates that two or more nodes can transmit their beacons concurrently;

FIGS. 6A-6E illustrate an embodiment of a beacon frame in accordance with a preferred embodiment of the invention.

NOTATION AND NOMENCLATURE

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections. The term "system" refers to a combination of two or more components and may be used in any one of a variety of contexts such as a communication system, a sub-system of a communication device, a system of wireless nodes, etc. The term "piconet" refers to a network of two or more wireless devices.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
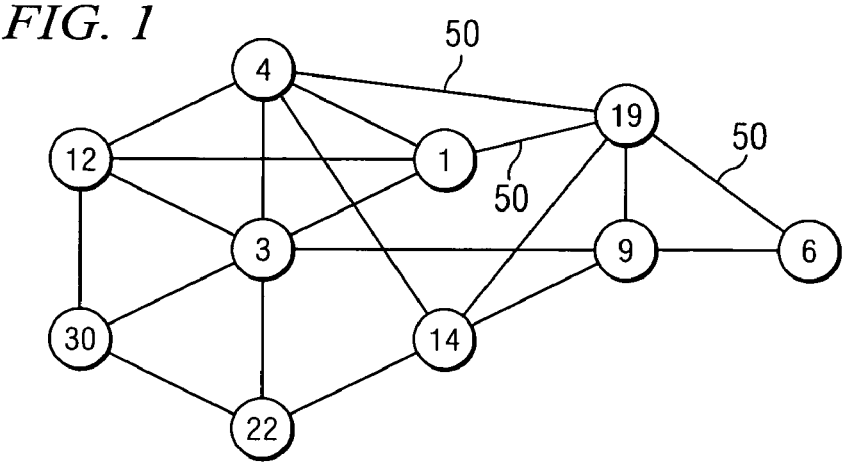
FIG. 1 shows a wireless communication network comprising a plurality of nodes.

Referring now to FIG. 1, a wireless communication network is shown comprising two or more nodes. In the exemplary wireless communication network of FIG. 1, the network comprises nodes labeled as node 1, node 3, node 4, node 6, node 9, node 12, node 14, node 19, node 22, and node 30. Each node in the network is capable of wirelessly communicating with one or more other nodes in the network. The lines 50 interconnecting the various nodes depict the possible communication paths within the network. For example, node 1 is within wireless communication range of nodes 3, 4, 12, and 19 and thus is shown interconnected to those nodes in FIG. 1 by way of four connection lines 50. By way of further example, node 6 is connected by two lines 50 to nodes 9 and 19 to indicate that node 6 is within communication range of nodes 9 and 19. Node 6, however, is not shown as being connected to any of the other nodes in the network, thereby indicating that node 6 is not within communication range of such other nodes. For example, node 6 is not within radio range of node 12. Two nodes that are within direct wireless communication range of each other are said to be "immediate neighbors."

In accordance with a preferred embodiment of the invention, each node is capable of transmitting a "beacon" message frame. A beacon is received by any node within communication range of the node that transmits the beacon. In general, beacons are used to coordinate access to the wireless medium among the various nodes in the network. Each node becomes aware of the existence of its immediate neighbors based on receiving a beacon from each such neighbor. The use and format of a beacon will be further described in detail below.

Figure 2:
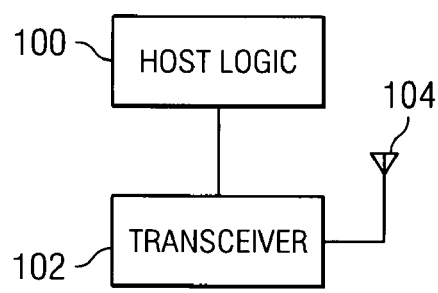
FIG. 2 shows an embodiment of a node.

Each node in the network can be any type of wireless-enabled communication device such as a computer, a personal data assistant (PDA), and the like. FIG. 2 shows an exemplary embodiment of a typical node as comprising host logic 100 coupled to a transceiver 102. An antenna 104 is connected to the transceiver 102 to provide wireless communication (e.g., radio communication) to other nodes in the network. The transceiver 102 is capable both of transmitting data to and receiving data from other nodes. As such, the communication links between nodes generally comprises a bi-directional communication path. The host logic performs various functions specific to the node. If the node was a computer, for example, the host logic 100 would include the computer's processor, memory, etc.

It can be observed from FIG. 1 that a node can be within communication range of one or more other nodes, but out of communication range from still other nodes. The group of nodes that are outside the communication range of a particular node fall into two categories. In a first category are nodes that are within communication range of a node that itself is within communication range of the particular node. For example, nodes 1, 3, 4, and 14 are outside the communication range of node 6 but are within communication range of either or both of nodes 9 and 19 which are themselves within communication range of node 6.

A second category of "out of communication range" nodes are those nodes that are not even within communication range of a node that is within radio range of a given node. Referring to the example of FIG. 1 again, this latter category of nodes comprises nodes 12, 22, and 30. Nodes 12, 22, and 30 are not within communication range of a node that is within communication range of node 6. For example, node 12 is within communication range of nodes 1, 3, and 4, but none of nodes 1, 3, and 4 are themselves within communication range of node 6.

Figure 3:
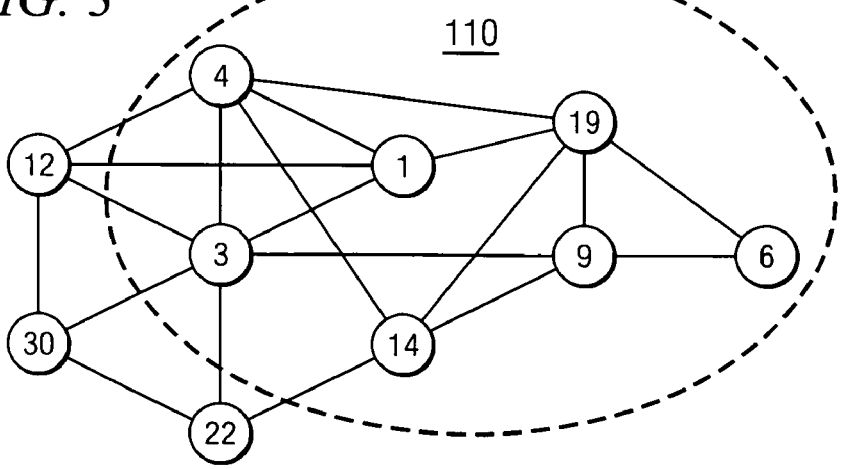
FIG. 3 illustrates the "extended neighborhood" of a node.

Based on the groupings of nodes as discussed above, the concept of an "extended neighborhood" can be defined for each node in a communication network. Referring now to FIG. 3, the communication network of FIG. 1 has been redrawn, this time with a dashed line 110 encircling nodes 1, 3, 4, 6, 9, 14, and 19. Dashed line 110 encircles those nodes that comprise the extended neighborhood of node 6. As such, the extended neighborhood 110 of node 6 comprises nodes 9 and 19 that are within direct communication range of node 6, as well as nodes 1, 3, 4, and 14 that, while not within direct communication range of node 6, are still within communication range of a node (nodes 9, 19) that is within direct communication range of node 6. In the example of FIG. 3, the extended neighborhood 110 of node 6 specifically excludes nodes 12, 22, and 30 which are, as described above, not within communication range of node 6 or within communication range of a node that is within communication range of node 6.

The concept of an extended neighborhood can be used to implement an efficient wireless medium access protocol as described herein. In accordance with a preferred embodiment of the invention, each node in the wireless communication network is capable of transmitting a beacon. Accordingly, each node is capable of receiving beacons from other nodes within wireless communication range of that node. The beacons can be used to convey neighborhood information in accordance with various embodiments of the invention as illustrated below. As a result of this distributed transmission of beacons through the network, two or more nodes outside an extended neighborhood of one of the nodes may transmit their beacons simultaneously without repercussion of a collision.

FIG. 4 illustrates a method embodiment comprising actions 130 and 132. The method of FIG. 4 preferably is performed independently by each node in the network. At 130, the method comprises receiving a beacon from another node. Preferably, the beacon received identifies one or more nodes that are within communication range of the node that transmitted that beacon. The received beacon also specifies the order for which other nodes are to transmit beacons. The preferred format for the beacon message (also called a "frame") will be discussed below with respect to FIGS. 6A-6E. At 132, the node that receives the beacon generates its own beacon based on information contained in the received beacon. The generated beacon specifies nodes that are to transmit future beacons. Further, the generated beacon may also include immediate neighborhood information of the node generating the beacon. For example, a beacon generated by node 19 (see FIG. 1) would include the identity of nodes 1, 4, 6, 9, and 14 that are within direct communication range of node 19. Any node that receives the beacon from node 19 will thus be informed that nodes 1, 4, 6, 9, and 14 are within direct communication range of node 19. Node 6, for example, will be informed that node 1 is within range of node 19.

As explained above, each node becomes aware of the existence of its immediate neighbors based on receiving a beacon from each such neighbor. By receiving beacons from nodes 1, 4, 6, 9, and 14, node 19 becomes aware of the existence of those neighbor nodes. By receiving beacons from nodes 9 and 19, node 6 is made aware that nodes 9 and 19 are immediate neighbors of node 6. Further, the beacons transmitted by nodes 9 and 19 identify the immediate neighbors of nodes 9 and 19. Armed with this neighborhood information, node 6 will be aware of its own neighbors and the neighbors of its neighbors (node 6's extended neighborhood). Alternatively stated, node 6 will be aware of its own neighbors, nodes 9 and 19, as well as its neighbor's immediate neighbors, nodes 1, 3, 4, and 14. Nodes that are within the same extended neighborhood should not transmit beacons simultaneously to avoid collisions. Nodes that are not within the same extended neighborhood (e.g., nodes 6 and 12) can transmit beacons simultaneously because their spatial separation avoids or reduces the potential for collisions. Accordingly, each node need only be aware of the identity of the nodes in its extended neighborhood. The beacons described herein convey sufficient information by which each node can be made aware of its extended neighborhood. A preferred beacon frame format is described below with regard to FIG. 6A-6E.

FIG. 5 illustrates a time sequence of beacons comprising beacon 11 through beacon 17 transmitted in order one after the other. The time between beacons, denoted by reference numeral 120 comprises time in which one or more nodes may access the wireless medium to transmit data. Each beacon preferably coordinates the access to the wireless medium during the time period 120 immediately following that beacon. The time from one beacon to next, designated with reference numeral 121, is referred to as the "beacon interval." As can be seen in the example of FIGS. 1 and 5, nodes 6 and 12 as well as nodes 19 and 30 are permitted to transmit their beacons simultaneously. This results from the fact that node 12 and 30 are not within the extended neighborhood of node 6 and 19, respectively. Because no node is within direct communication range of nodes 6 and 12, the potential for a collision due to the simultaneous transmission of beacons from nodes 6 and 12 is avoided or at least greatly reduced. The same is true regarding nodes 19 and 30.

In accordance with the preferred embodiment, each node is capable of generating and transmitting a beacon. A beacon contains a variety of information such as the order of which nodes are to transmit future beacons and reservation information as to which nodes are granted access to the wireless medium at specified points in time, etc. A beacon may also contain new information not previously known to other nodes. For example, a node may have a need to reserve access to the wireless medium for communications with other nodes. Such a node may generate an "access change" beacon that contains the new information (e.g., the new reservation request). Based on the beacons previously received, the node will already know the extent of the wireless medium availability and can submit a request for medium access change accordingly. The distributed nature of the beacons then disseminates the new reservation request to other nodes so that such other nodes are made aware of and comply with the new reservation request. Other types of access changes can also be implemented in an access change beacon such as an altered order for the nodes that are to transmit beacons in the future. The identification as to whether a beacon is an access change beacon may be encoded in a beacon header that accompanies the beacon payload.

Figure 6C:
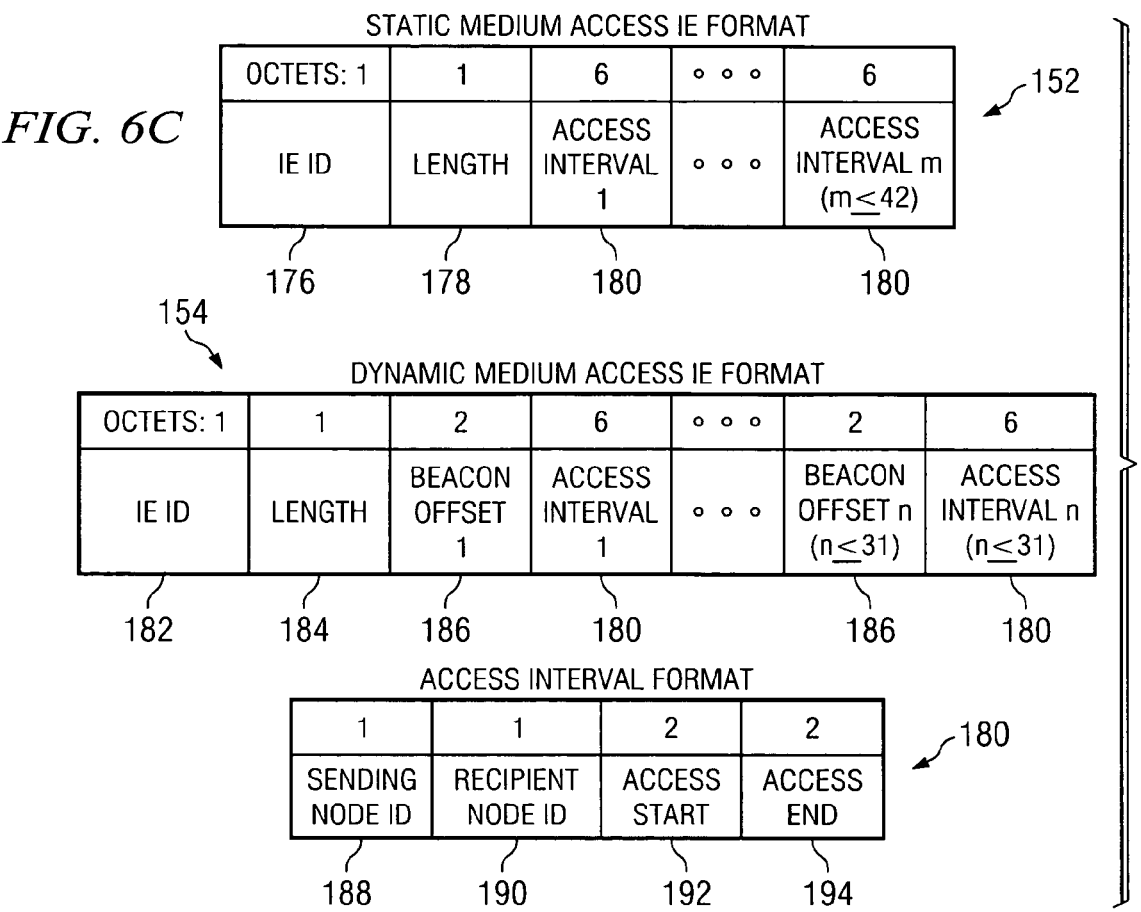

The preferred format of a beacon frame will be illustrated below with respect to FIGS. 6A through 6E. The illustrated beacon format is applicable for beacons and access change frames as well. Referring to FIG. 6A, a preferred embodiment of a beacon frame payload is illustrated as comprising a plurality of fields. Such fields include a beacon primary field 150, a static medium access information element (IE) 152, a dynamic medium access IE 154, a dynamic node order IE 156, a static node order IE 158, a node capability IE 160, and one or more other IEs 162 if desired. FIG. 6B illustrates a preferred embodiment of the beacon primary field 150. As shown, the beacon primary field 150 comprises a beacon counter 164, a beacon interval 166, a beacon set ID 168, a beacon transmitter address 170, a beacon countdown value 172 and a reserved field 174. The beacon counter 164 specifies a unique, preferably sequential number associated with the beacon containing this parameter. The beacon counter is incremented by one for each beacon to be transmitted at the next target beacon transmit time (TBTT). The TBTT is the time at which a particular beacon is scheduled to be transmitted. Each node that is to transmit a beacon generates the beacon counter by incrementing the beacon counter in the last received beacon. The beacon counters of the beacons illustrated in FIG. 5 are the numerals 11 through 17.

Referring still to FIG. 6B, the beacon interval 166 specifies the length of the interval, in units of microseconds, between the current TBTT and the next TBTT (time period 121 in FIG. 5). The beacon set ID 168 identifies the set of beacons transmitted by the device. The beacon transmitter address 170 specifies the address of the node sending the beacon referenced in the beacon counter 164. The beacon countdown value 172 specifies the number of beacon intervals before an access change, if any, specified in the current frame (if the frame contains new or modified access change information) takes effect. The beacon countdown value may initially be set to a NumCountdownlnitial (NCI) value and then decremented by one in each successive beacon until reaching the value of zero. The value of zero for the beacon countdown indicates that the change is to take effect in the current beacon interval or took effect since an earlier beacon interval, while a value of one indicates that the change is to take effect in the subsequent beacon interval. A change may be made when another change is yet to take place, that is, when the beacon countdown value is nonzero, by resetting the beacon countdown to the NCI value. The beacon interval 166 and beacon set ID 168 may be changed via the access change frames.

FIG. 6C shows a preferred embodiment of the static medium access IE 152 and the dynamic medium access IE 154. The static medium access IE 152 includes an IE ID 176, a length value 178, and one or more access intervals 180. The IE ID field 176 comprises an identifier that identifies the information element as the static medium access IE. The length value 178 specifies the length of the field that follows this length field in this static medium access IE; from the length value the number of access intervals 180 can be determined by nodes receiving the beacon. Each access interval comprises a format such as that shown in FIG. 6C as including a sending node ID 188, a recipient node ID 190, an access start value 192, and an access end value 194. Each access interval 180 specifies a time interval for wireless medium access that is valid in each beacon interval following the beacon in which the beacon countdown 172 is set to zero. The sending node ID 188 identifies the node that is permitted to transmit in the associated time interval. In some embodiments, the sending node ID 188 may be encoded as a broadcast node ID or a multicast node ID which means that all of the nodes (for a broadcast situation) or the nodes associated with the multicast node ID (for a multicast situation) may transmit in this time interval based on a suitable contention algorithm (e.g., a binary backoff carrier sense multiple access ("CSMA") algorithm). The recipient node ID 190 identifies the node required to receive in this time interval. If the recipient node ID is set to the broadcast node ID or a multicast node ID, all of the active nodes or the active nodes associated with the multicast node ID are potential intended recipients in this time interval.

The access start value 192 specifies the start time, preferably in units of microseconds, of this access time interval relative to the TBTT that begins the beacon interval in which this time interval is located. A value of zero for the access start value 192 indicates that this time interval may start in this beacon interval anywhere outside the beacon and the other time intervals specified in the static medium access IE 152 and dynamic medium access IE 154 contained in this beacon or previous beacons. The access end value 194 specifies the end time, in units of microseconds, of this time interval relative to the TBTT beginning the beacon interval in which this time interval is located. As with the start value 192, a value of zero indicates that this time interval may end in this beacon interval anywhere outside the beacon and the other time intervals specified in the applicable static medium access IE and dynamic medium access IE contained in this or previous frames.

FIG. 6C also shows the format of the dynamic medium access IE 154 comprising an IE ID 182, a length value 184, one or more beacon offset values 186 and an access interval 180 associated with each beacon offset 186. The format of each such access interval 180 is also shown in FIG. 6C and was discussed above. The IE ID field 182 comprises a value that identifies that information element as the dynamic medium access IE. The length field 184 specifies the length of the field that follows this length field in this dynamic medium access IE 154 and thereby defines the number of beacon offset and access interval pairs contained within the information element 154. Each beacon offset 186 is paired with the subsequent access interval 180 and specifies a beacon interval, relative to the current beacon interval, to which the paired access interval applies. A value of zero for the beacon offset 186 indicates that the paired access interval 180 is valid in the current beacon interval, while a value of one indicates that the paired access interval is valid in the next beacon interval, and so on. Each access interval 180 in the dynamic medium access IE 154 is paired with the preceding beacon offset and specifies a time interval for medium access that is valid only in the beacon interval referenced in that beacon offset relative to the beacon counter 164.

Figure 6D:
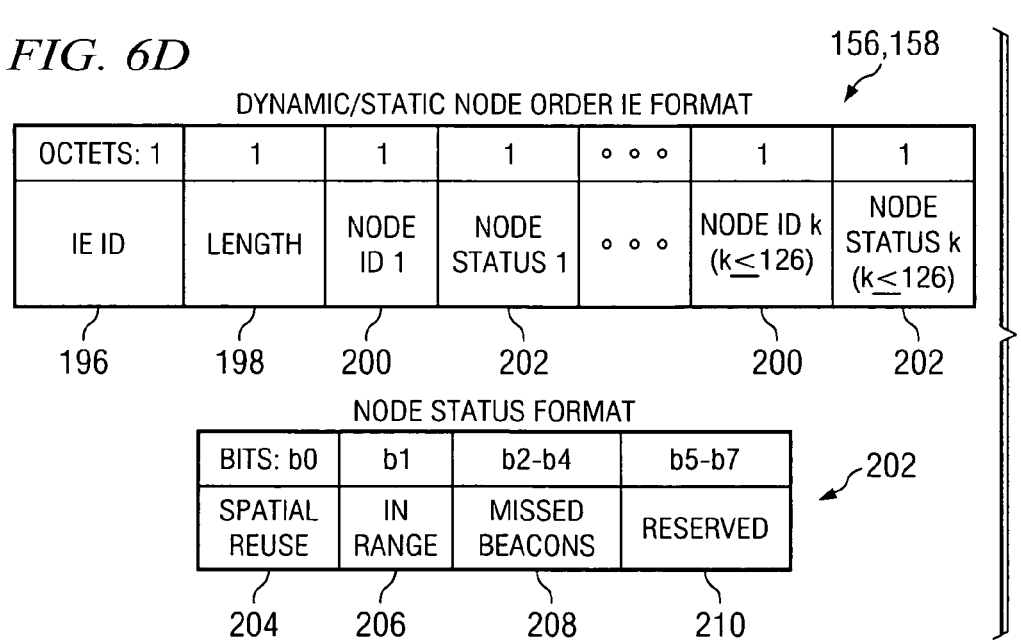

The format of the dynamic node order and static node order IEs 156 and 158 is as shown in FIG. 6D and includes an IE ID 196, a length value 198, one or more node IDs 200, and a node status 202 associated with each node ID 200. The IE ID 196 comprises a value that defines the information element as either a dynamic node order IE 156 or a static node order IE 158. The length value 198 defines the length of the field that follows this length field in this IE 156, 158. Based on the length value 198, the number of node ID and node status pairs 200, 202 can be determined.

Each node ID 200 is paired with a subsequent node status 202 and identifies a node that is scheduled to transmit a beacon after the current beacon. The first node ID following the length value 198 identifies the node that is scheduled to transmit a beacon at the next TBTT. Each successive node ID 200 identifies the node scheduled to transmit a beacon at each successive TBTT, provided the spatial reuse bit 204 (discussed below) in the paired node status field is set to zero. A node ID 200 with the corresponding spatial reuse bit 204 set to a value of one identifies the node scheduled to transmit a beacon at the same TBTT as the node identified in the preceding node ID field 200. The same node ID value may appear more than once in either information element 156 or 158, indicating that the corresponding node may transmit a beacon more than once in the set of beacons scheduled to be transmitted by the nodes specified in that IE. The node ID fields 200 thus define the order of nodes that are to transmit future beacons. The nodes listed in IE 156, 158 are the nodes that are in the extended neighborhood of the node transmitting the current beacon.

Each node status 202 is paired with the preceding node ID 200 and further contains the parameters also shown in FIG. 6D. In accordance with the preferred embodiment, such parameters include a spatial reuse bit 204, an in-range bit 206, a missed beacons field 208 and a reserved field 210. The spatial reuse bit 204 specifies whether the node identified in the paired node ID field 200 is scheduled to transmit a beacon at the same TBTT as the node identified in the previous node ID. The in-range bit 206 indicates whether the node identified in the paired node ID field 200 is in communication range of the node transmitting the present beacon frame. If the node identified in the paired node ID field is in communication range of the node transmitting the beacon, then the associated in-range bit 206 is set to one to so indicate. If, however, the node identified in the paired node ID field is not within communication range of the node transmitting the current beacon, the associated in range bit 206 is set to a value of zero. The missed beacons filed 208 indicates the number of the latest, consecutive beacons that were expected from the node identified in the paired node ID field 200, but were not received by the node transmitting the current beacon.

The dynamic node order IE 156 specifies a list of nodes that will be transmitting a beacon following the listed order without repeating the list. The static node order IE 158 specifies a list of nodes that will be transmitting a beacon following the listed order. The listed order of the static node order IE is repeated.

Figure 6E:
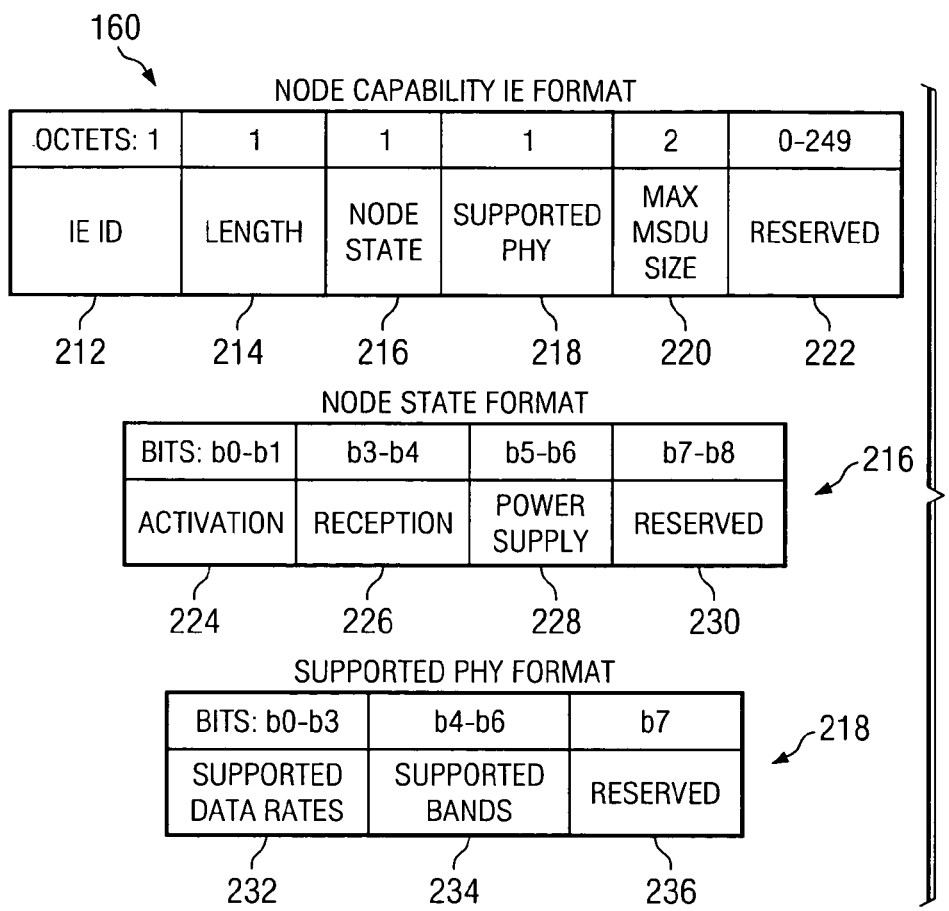

FIG. 6E illustrates the definition of the node capability IE 160. As shown, the node capability IE 160 includes an IE ID 212, a length 214, a node state 216, a supported physical layer (PHY) 218, and maximum medium access control ("MAC") service data unit ("MSDU") size 220, and a reserved field 222. The IE ID 212 is encoded to specify that the current IE is the node capability IE 160 and the length value 214 defines the length of the field that follows this length field in this node capability IE 160. The node state 216 is also illustrated in FIG. 6E as including an activation field 224, a reception field 226, a power supply field 228, and a reserved field 230. The activation field 224 preferably comprises two bits that are encoded to indicate the current state of the node transmitting the beacon. With two bits, the activation field 224 can encode four different states including the "active" state, the "becoming active" state, the "becoming inactive" state, and the "becoming active with another piconet" state. The active state refers to a case where the node is constantly ready to transmit and receive frames. The becoming active state refers to a case where the node is becoming ready to transmit and receive frames. The becoming inactive state refers to a case where the node will not be ready to transmit and receive frames. The becoming active with another piconet refers to a case where the node will be ready to transmit and receive frames belonging to a different piconet but not to the current piconet. The reception field 226 preferably includes three bits to encode as many as eight different scenarios in which the node transmitting the beacon will be receiving frames. The reception field 226 encodes whether the node transmitting the beacon will be receiving frames 1) always (outside its own transmission time), 2) outside time intervals reserved for CSMA-based contention, 3) in time intervals reserved for CSMA-based contention, 4) in time intervals for which this node is specified as a recipient, and 5) in time intervals for which the node specified as the sender of any time intervals with this node specified as the recipient is specified as the sender. Three additional encodings of the reception field 226 are reserved.

The power supply field 228 preferably comprises two bits that are encoded to indicate the current power level of the node transmitting the beacon. The power supply bits can be encoded to indicate a low battery level, a mid-battery level, a high battery level, and a power connection to an alternating current (AC) power source. The supported PHY field 218 of the node capability IE 160 contains a supported data rates field 232, a supported bands field 234, and a reserved field 236. The supported data rates field 232 indicates the data rates supported by the node transmitting this frame and may be encoded as the same as in the PHY header (not specifically shown) and following the same bit order as well. The supported bands field 234 indicates the frequency bands supported by the node transmitting this beacon frame and also is encoded as the same as in the PHY header. The max MSDU size field 220 preferably specifies the maximum size, in units of octets, of MSDUs supported by the node transmitting this frame.

Figure 7:
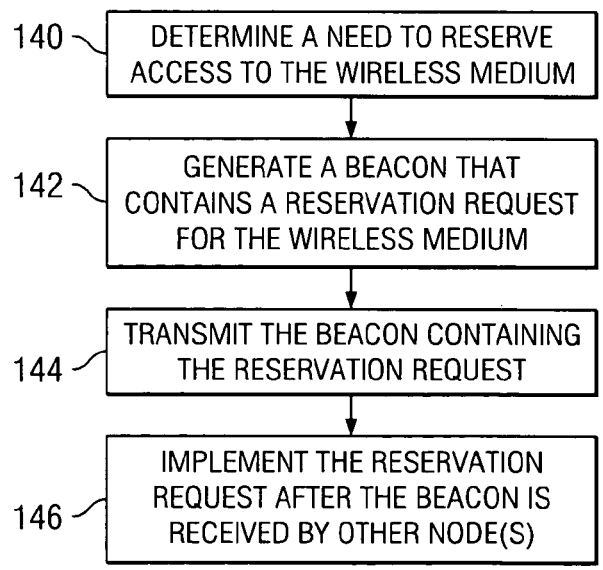
FIG. 7 shows another method embodiment.

FIG. 7 illustrates another method embodiment comprising actions 140-146. The method embodiment of FIG. 7 is a method by which each node can submit a wireless medium access reservation to other nodes. With this method, access reservations can be performed in a distributed manner throughout the network. The method is performable by each node via the access change beacon.

Referring to FIG. 7, at 140 the method comprises the node determining a need to reserve access to the wireless medium. The access may be for that node to transmit data to one or more other nodes, or for another node to transmit data to one or more other nodes. At 142, the node generates an access change beacon that contains a reservation request for the wireless medium. The reservation request may be in the form of an altered set of access intervals 180 from that contained in prior beacons or otherwise known to other nodes. At 144, the node transmits the access change beacon containing the reservation request. At 146, the node that transmits the access change beacon implements the reservation request (i.e., causes the nodes identified in the altered access interval list to access the medium in accordance with the new access interval list).

The nodes that receive the access change beacon must honor the reservation request unless the requested reservation conflicts with current medium access rules regarding which nodes can access the medium at which time periods. If, however, there is no such conflict, the new reservation request is honored by the other nodes after the beacon countdown value 172 has reached zero. This time period permits sufficient time for the reservation request in the access change beacon to propagate throughout the extended neighborhood of the node initiating the change.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method implemented in a distributed wireless communication network comprising a plurality of nodes that communicate across a wireless medium in a distributed fashion, the method comprising:

a first node receiving a first beacon from a second node, said first beacon identifying a node within communication range of the second node; and the first node generating a second beacon based on the first beacon, said second beacon containing identities of nodes and an order in which said identified nodes are to transmit beacons and, for each such identified node, the second beacon contains an in-range bit field that specifies which of the identified nodes are within wireless communication range of the first node and which of the identified nodes are not within wireless communication range of the first node.

2. The method of claim 1 further comprising every node in the distributed network generating a beacon that specifies an order of nodes that are to transmit beacons, said order based on information in a beacon received from another node.

3. The method of claim 1 further comprising the first node determining those nodes that are within wireless communication range of the first node.

4. The method of claim 1 further comprising the first node transmitting said second beacon.

5. The method of claim 1 wherein generating a second beacon based on the first beacon further comprises generating a second beacon identifying the second node.

6. The method of claim 1 wherein specifying an order of nodes further comprises specifying an order of nodes based on the nodes within communication range of the second node identified in the first beacon.

7. A node operable in a distributed wireless distributed network, comprising:

host logic; and a wireless transceiver coupled to said host logic, said wireless transceiver receiving a first beacon from a transmitting device, said first beacon configured to identify another device that is within communication range of the transmitting device; and wherein said host logic generates a second beacon based on the first beacon, said second beacon containing identities of devices and an order in which said identified devices are to transmit beacons and, for each such identified device, the second beacon contains an in-range bit field that specifies which of the identified devices are within wireless communication range of the node and which of the identified devices are not within wireless communication range of the node.

8. The node of claim 7 wherein said host logic determines those devices that are within wireless communication range of the node.

9. The node of claim 7 wherein the host logic causes the wireless transceiver to transmit the second beacon.

10. A distributed wireless communication system, comprising:

a plurality of distributed wireless communication devices each capable of transmitting beacons and receiving beacons and capable of communicating with at least one other of said plurality of wireless communication devices;

wherein each wireless communication device transmits a beacon that contains identities of other devices and an order of which said identified devices are to transmit beacons and the beacon also contains an in-range bit field that encodes which of the identified devices are within wireless communication range of the device transmitting the beacon and which of the devices are not within wireless communication range of the device transmitting the beacon; and wherein at least two wireless communication devices transmit beacons simultaneously.

11. The system of claim 10 wherein said at least two wireless communication devices that transmit beacons simultaneously are not within wireless communication range of each other and are not within wireless communication range of a common wireless communication device.

* * * * *

UNITED STATES PATENT AND TRADEMARK OFFICE
CERTIFICATE OF CORRECTION

PATENT NO.       : 7,668,126 B2  
APPLICATION NO.  : 11/011963  
DATED            : February 23, 2010  
INVENTOR(S)      : Jin-Meng Ho Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 970 days.

Signed and Sealed this

Twenty-eighth Day of December, 2010

David J. Kappos  
*Director of the United States Patent and Trademark Office*